United States Patent [19]

Dugan et al.

[11] Patent Number: 5,611,172
[45] Date of Patent: Mar. 18, 1997

[54] APPARATUS FOR THE TREATMENT OF LIVE PLANTS

[75] Inventors: Thomas F. Dugan, Perry; Daniel R. Rupnow, Wickliffe; Brian J. Sroub, Shaker Heights, all of Ohio

[73] Assignee: Agripak, Inc., Pepper Pike, Ohio

[21] Appl. No.: 369,306

[22] Filed: Jan. 6, 1995

Related U.S. Application Data

[63] Continuation of Ser. No. 957,618, Oct. 6, 1992, abandoned.

[51] Int. Cl.$^6$ .................................................. A01G 31/00
[52] U.S. Cl. ..................... 47/1.01; 47/18; 47/62
[58] Field of Search ......................... 47/1.01, 1 B, 1 M, 47/62, 79 N, 18

[56] References Cited

U.S. PATENT DOCUMENTS

| | | |
|---|---|---|
| 1,909,013 | 5/1933 | Ruzicka. |
| 2,446,509 | 8/1948 | Fischer. |
| 2,664,670 | 1/1954 | Mulford. |
| 3,738,956 | 6/1973 | Glatti et al.. |
| 3,857,934 | 12/1974 | Bernstein et al.. |
| 3,962,823 | 6/1976 | Zipperer, III. |
| 4,014,134 | 3/1977 | Womack, Jr.. |
| 4,079,547 | 3/1978 | Walker. |
| 4,411,921 | 10/1983 | Woodruff. |
| 4,423,080 | 12/1983 | Bedrosian et al.. |
| 5,136,804 | 8/1992 | Rothem ................................ 47/60 EL |
| 5,217,696 | 6/1993 | Wolverton ................................. 47/79 |
| 5,269,094 | 12/1993 | Wolverton ................................. 47/62 |
| 5,277,877 | 1/1994 | Jefrey ........................................ 47/79 |

FOREIGN PATENT DOCUMENTS

| | | | |
|---|---|---|---|
| 300536 | 1/1989 | European Pat. Off. ............... 47/62 |
| 4356144 | 12/1992 | Japan ..................................... 47/62 |
| 584027 | 4/1993 | Japan ..................................... 47/62 |
| 1644828 | 4/1991 | U.S.S.R. .................................. 47/62 |

OTHER PUBLICATIONS

*Pollution Eater?*, News Herald (Lake County, Ohio), Oct. 18, 1992, Home Section, p. 15.

*Primary Examiner*—Henry E. Raduazo
*Attorney, Agent, or Firm*—Calfee, Halter & Griswold

[57] ABSTRACT

An apparatus for the efficient treatment of a live plant is provided. In particular, the apparatus can be used to treat a live plant before being packaged in a sealed container in which the plant can live without any of the care or maintenance that live plants normally require. The apparatus comprises a substantially sealed pressure vessel, a vacuum system, and a root treatment system. The substantially sealed pressure vessel receives the container having the rooting medium and the roots of the live plant maintained therein. The container also has a runoff opening therein. The vacuum system, which is connected to the pressure vessel, draws air through the pressure vessel and live plant and thereby removes a predetermined amount of fluid from the rooting medium via the runoff opening. The root treatment system then adds a predetermined amount of a root treatment solution to the rooting medium.

2 Claims, 3 Drawing Sheets

5,611,172

APPARATUS FOR THE TREATMENT OF LIVE PLANTS

This is a continuation of application Ser. No. 07/957,618 filed Oct. 6, 1992 and now abandoned.

FIELD OF THE INVENTION

The present invention relates to an apparatus for the treatment of live plants in advance of retail distribution. More particularly, the present invention relates to an apparatus which removes a predetermined amount of fluid from the rooting medium surrounding the roots of the live plant and adds a predetermined amount of root treatment solution to the rooting medium and leaves.

BACKGROUND OF THE INVENTION

Most live plants to be sold in a retail store environment are fragile and require special attention for packaging, shipment, storage, display, and/or sale. In order to survive, live plants should be given proper care and maintenance, including adequate lighting, regular watering, and protection from insects, fungus, and bacteria. Live plants should also be protected from handling by the retailer and the consumer. This combination of requirements has made live plants a difficult consumer product to package and market for purposes of sale through conventional self-service retail channels, such as gift, department, and grocery stores.

The plant package shown in U.S. Pat. No. 4,118,890 provided solutions to many of the packaging problems faced by prior live plant retailers. This patent provides a sealed container which maintains a live plant in a moist environment without regular watering and protects the plant from insects, fungus, and bacteria. The container is transparent to allow light to be transmitted to the plant and to allow visual inspection of the plant. However, a live plant must be properly prepared before being packaged in the sealed container of the '890 patent.

In the past, this preparation consisted of adjusting the moisture content of the soil to a sufficiently low level, as by allowing the soil to naturally evaporate, and thereafter manually adding fertilizer, insecticide, and fungicide to the soil. The process of allowing a plant to naturally dry out and then manually adding treatment to the soil can be extremely time consuming and thus inefficient. Therefore, a need existed to provide a more efficient system for the treatment of live plants, and especially for the treatment of a live plant before being packaged in a sealed container in which the plant survives by providing the proper balance of moisture and nutrients prior to sealing the plant in the container.

SUMMARY OF THE INVENTION

The present invention enables more efficient treatment of a live plant for retail distribution. The present invention provides an apparatus which removes a predetermined amount of fluid from the rooting medium surrounding the roots of the live plant and adds a root treatment solution to the rooting medium. In this manner, a live plant can be efficiently treated, and in the preferred embodiment, a live plant can be treated before being packaged in a sealed container in which the plant can live for a period of time without further care or maintenance.

More particularly, the present invention provides an apparatus which comprises a substantially sealed pressure vessel, a vacuum system, and a root treatment system. The pressure vessel receives the containers having the rooting medium and the roots of the live plant maintained therein. Each of the containers also has a runoff opening therein. The vacuum system, which is connected to the pressure vessel, draws air through and from the pressure vessel and live plant containers, and thereby removes a predetermined amount of fluid from the rooting medium via the runoff openings. The root treatment system then adds a predetermined amount of a root treatment solution to the rooting medium. The vacuum system and root treatment system are each interconnected with a controller system which is programmed to operate the systems for a programmed predetermined amount of time to obtain the desired treatment of the live plants. At this point, the live plants can be further treated or packaged in a sealed container, such as the container disclosed in U.S. Pat. No. 4,118,890.

These and other features of the present invention are fully described and particularly pointed out in the claims. The following detailed description and accompanying drawings set forth in detail a few illustrative embodiments. However, these embodiments are indicative of but a few of the various ways in which the principles of the present invention may be employed.

DETAILED DESCRIPTION OF THE INVENTION

Figure 1:
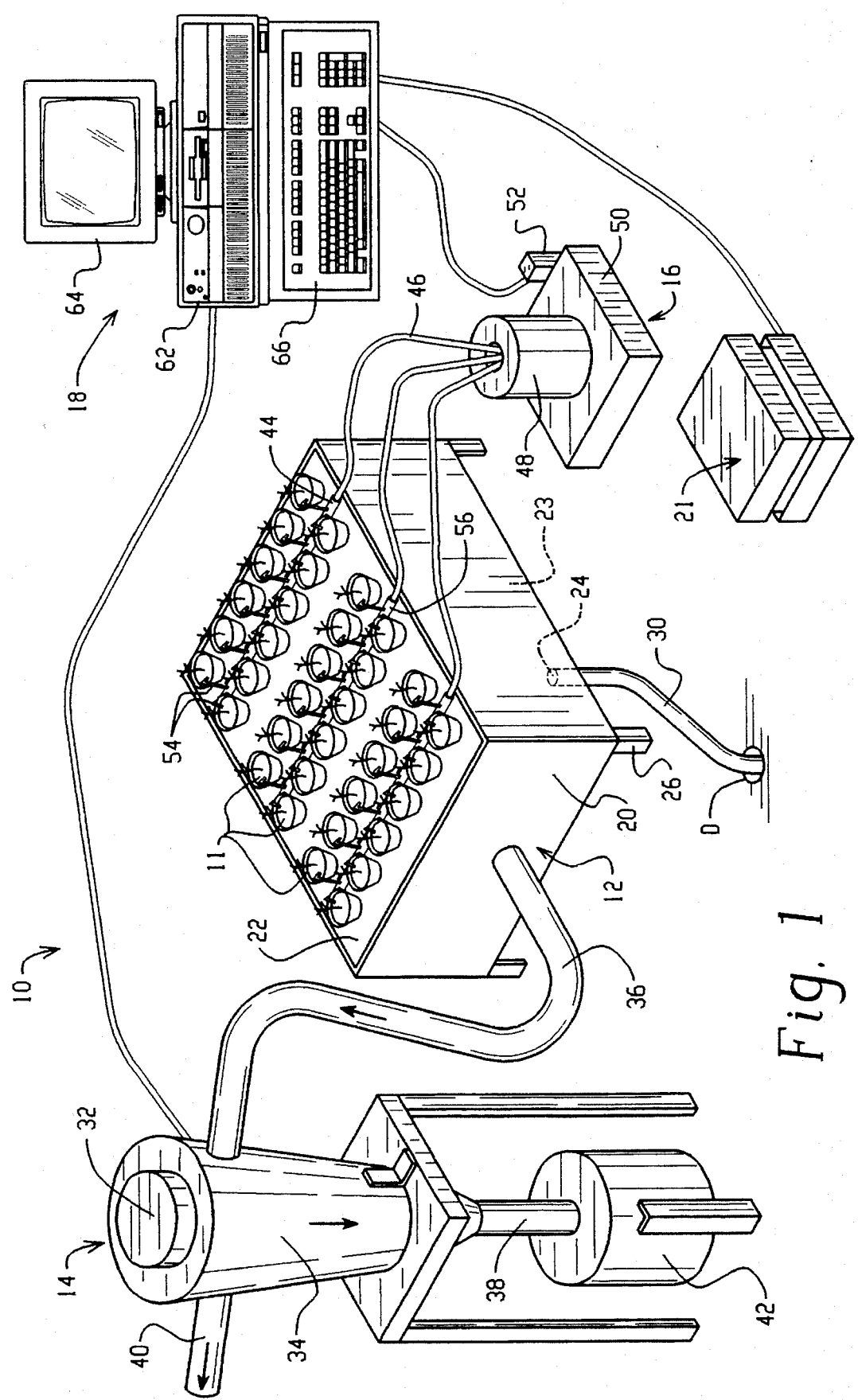
FIG. 1 is a schematic view of the apparatus of the present invention.
Figure 2:
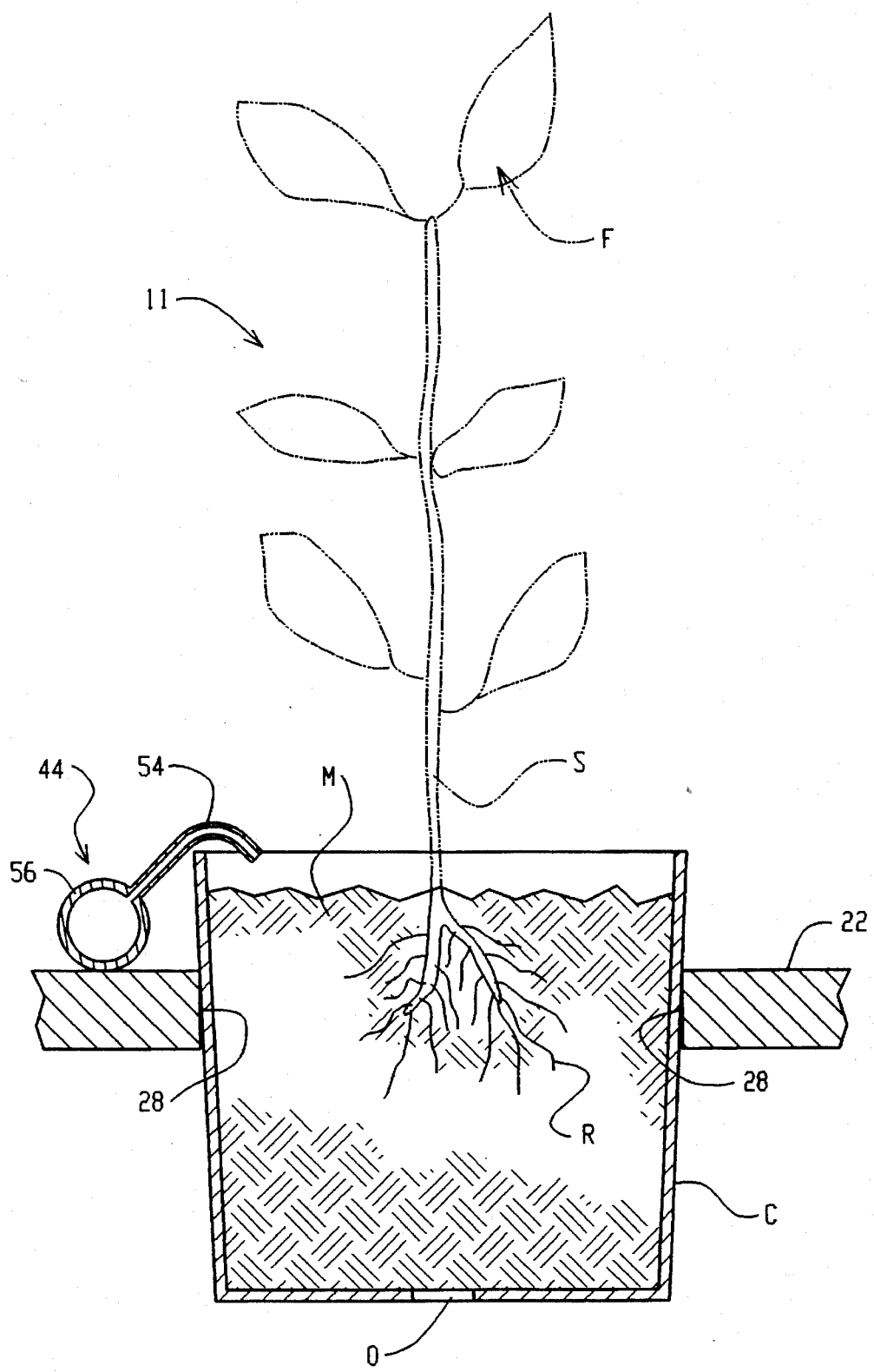
FIG. 2 is a schematic view of a live plant engaged with the pressure vessel.

Referring now to the drawings and initially to FIG. 1, a schematic view of the apparatus of the present invention is shown. The apparatus, indicated generally at 10, enables more efficient treatment of a live plant 11. As shown in FIG. 2, the live plant 11 includes roots R, a stem S, foliage F, rooting medium M, and a container C. The rooting medium M typically consists of soil and other root sustaining substances, as well as fluid, and surrounds the roots R of the live plant. The rooting medium M and the roots R are contained within the container C. The container C also has a runoff opening O therein.

Referring again to FIG. 1, the apparatus 10 comprises a substantially sealed pressure vessel 12, a vacuum system 14, a root treatment system 16, and a controller system 18. The substantially sealed pressure vessel 12 receives and supports the containers of the live plants 11 having the rooting medium M and the roots R maintained therein, as shown in FIG. 2. The vacuum system 14 is connected to the pressure vessel 12 and draws air from and through the pressure vessel 12 and supported live plants 11. As the vacuum system 14 draws air through the pressure vessel 12 and live plants 11, it removes fluid from the rooting medium M via the runoff opening O. By saturating the rooting medium with fluid prior to providing the live plants to the pressure vessel, operation of the vacuum system for a predetermined period of time for a specified container C size, enables removal of a predetermined desired amount of fluid. After removal of a specific amount of fluid, the root treatment system 16 then operates for a specific time to add a predetermined amount of a root treatment solution to the rooting medium M. Thus, a minimum specified amount of root treatment solution is known to surround the roots following operation of the apparatus 10. With a known amount of solution fluid in the rooting medium, the live plant may then be further processed and packaged in a sealed container and survive for a desired time.

The root treatment solution may be of any desired substance or combination of substances, such as water, fungicide, pesticide, disinfestant and/or surfactant. The elements and amounts of the solution are known to those of ordinary skill in the art, and may depend upon the type of plant, the type of rooting medium, and/or the length of time the live plant must be stored prior to purchase.

In the illustrated embodiment, the pressure vessel 12 comprises a rectangular enclosure 20 which is substantially sealed and has a top portion 22, and a bottom portion 23 with a drainage opening 24. However, the pressure vessel could comprise any type of enclosure. Prior to being provided to the enclosure 20, the fluid saturated live plant may be weighed on conventional scale 21 to establish a base weight of the plant before fluid is further removed. The scale 21 can also be used at any point thereafter in processing of the live plant in order to establish the current weight and fluid content of the plant. Weight information, when also provided to the controller system 18, provides an information feedback loop concerning the status of the live plant, and specifically its fluid content.

The rectangular ensclosure 20 is supported by legs 26. The top portion 22 of the rectangular enclosure 20 has at least one container aperture 28 therein for receiving the live plant container C. In the illustrated embodiment, the top portion 22 has thirty-six (36) containers apertures 28 and thus can receive thirty-six (36) containers C. When a container C having the rooting medium M and the roots R maintained therein is placed in engagement with each of the container apertures 28, the rectangular enclosure 20 and containers C form the substantially sealed vessel. The drainage opening 24 in the rectangular enclosure 20 is connected to a hose 30 which empties into a drain D.

The vacuum system 14 comprises a vacuum device with a particulate separator 32, a collector 34, and conduit 36, 38,40 for interconnection with other portions of the apparatus 10. The vacuum device with the particulate separator 32 is of a conventional type, such as that sold by Murphy-Rodgers, Inc. of Huntington Park, Calif. The vacuum device 32 is connected to the substantially sealed pressure vessel 12 by means of conduit 36. The top portion of the collector 34 is connected to the bottom portion of the vacuum device 32 and the bottom portion of the collector 34 is connected to conduit 38. Conduit 38 empties into a particulate barrel 42 into which particulate matter removed from the containers C and pressure vessel 12 during operation are deposited. The vacuum device 32 is exhausted to atmosphere via conduit 40.

The root treatment system 16 comprises a sprayer 44, tubing 46, a reservoir 48 for storing root treatment solution, a pump 50 for providing solution from the reservoir to the sprayer, and a timing mechanism 52. The sprayer 44 comprises at least one nozzle 54 and interconnection conduit 56. Preferably, one nozzle 54 is provided for each container C. The conduit 56 connects the nozzles 54 to one another and to the reservoir 48 containing root treatment solution via tubing 46. In the preferred embodiment, the nozzles are Flow-Jet nozzles of the type manufactured by Spraying Systems Co. The tubing 46 connects the conduit piping 56 to the reservoir 48. The pump 50 is interconnected with the reservoir 48 and the timing mechanism 52 to supply root treatment solution to the sprayers 44 for a specified time under direction of the interconnected controller 18. The timing mechanism 52 comprises a conventional solenoid activated timing device. The pump and timing mechanism are conventional elements which are well known to those of ordinary skill in the art.

The controller system 18 comprises a conventional programmable digital computer 62, a monitor 64, and a keyboard 66, which are interconnected to one another in a conventional manner as schematically illustrated in FIG. 1. The controller system 18 controls operation of the vacuum system and the root treatment system.

In operation, the vacuum device 32 draws air through the live plants 11 supported in the substantially sealed pressure vessel 12 and through conduit 36. As the vacuum device 32 draws air through the live plants 11 and pressure vessel 12, it removes fluid from the rooting medium M via the runoff opening O. In the process of removing the fluid from the rooting medium M, the vacuum device 32 also draws some amount of the rooting medium M itself through the runoff opening O. The majority of the fluid that is removed from the rooting medium M drains to the bottom portion 23 of the rectangular enclosure 20 to the drainage opening 24 and empties through the hose 30 to the drain D. Air, some fluid, and rooting medium M are drawn by operation of the vacuum system through the conduit 36 into the vacuum device 32. The particulate separator of the vacuum device 32 then operates to separate the particulate (i.e. the rooting medium M) from the air exhausted from the conduit 40. Under the force of gravity, the particulate circulating in the air within the vacuum device from the separator is collected in the collector 34, and empties through the conduit 38 into the waste particulate barrel 42. The air within the vacuum device 32 is then exhausted through conduit 40.

After the predetermined amount of fluid has been removed from the rooting medium M during the timed operation of the vacuum system, the vacuum device is shut down under control of the programmed controller 18. The controller 18 then signals the timer mechanism 52, which activates the pump 50, to supply the root treatment solution from the reservoir 48 to the sprayers 44 via the tubing 46. The root treatment solution is provided to the conduit 56 and nozzles 54 and is applied to the rooting medium M.

The controller system 18 is programmed to operate the vacuum system 14 for a specified time to remove a predetermined amount of fluid from the rooting medium M and then to operate the root treatment system 16 for a specified time to add a predetermined amount of root treatment solution to the rooting medium M. In order to remove the predetermined amount of fluid from the rooting medium M, the vacuum system 14 must be operated for a predetermined period of time at a predetermined pressure. Likewise, in order to add the predetermined amount of the root treatment solution to the rooting medium M, the root treatment system 16 must be operated for a predetermined period of time. The necessary timing of such operation is dependent in part upon the size of the live plant container C, and/or the weight of the live plant 11 after fluid saturation as previously described.

Following the application of the root treatment solution, the live plant may be removed from the top portion of the pressure vessel and provided with any necessary additional treatments, such as foliage atomization, for example, before being packaged, or sealed in a container for shipment.

In the preferred embodiment of the apparatus, the root treatment system 16 adds approximately 50 millimeters of root treatment solution to the rooting medium M. Therefore, the vacuum system 14 must remove at least 50 millimeters of fluid from the rooting medium M to prevent over fill and runoff when the root treatment solution is later added to the rooting medium M. In order to remove at least 50 millimeters of fluid from the rooting medium M, experimentation has shown that the vacuum system 14 should be operated for a period of time in the range of approximately 15 to 60 seconds at a pressure in the range of approximately 5 column inches of water and 10 column inches of water, and preferably 30 seconds at 8 column inches of water. Obviously, faster times at higher pressures will remove the fluid faster. However, the speed of removal must be balanced with the strength of the specific plant to ensure that no damage to the roots occurs. Operating the vacuum system 14 in the ranges described typically will remove between 50 millimeters and 120 millimeters of fluid from the rooting medium M. Thus, the controlling factor in determining the correct period of time and pressure at which to operate the vacuum system 14 is the prevention of damage to the root hairs, which are the fine roots formed at the tip of the roots R. Depending upon the specific plant, operation at higher speeds and pressures may be possible. Operation of the vacuum system 14 in the ranges described above is not believed to cause damage to the root hairs of a wide variety of live plants.

Figure 3:
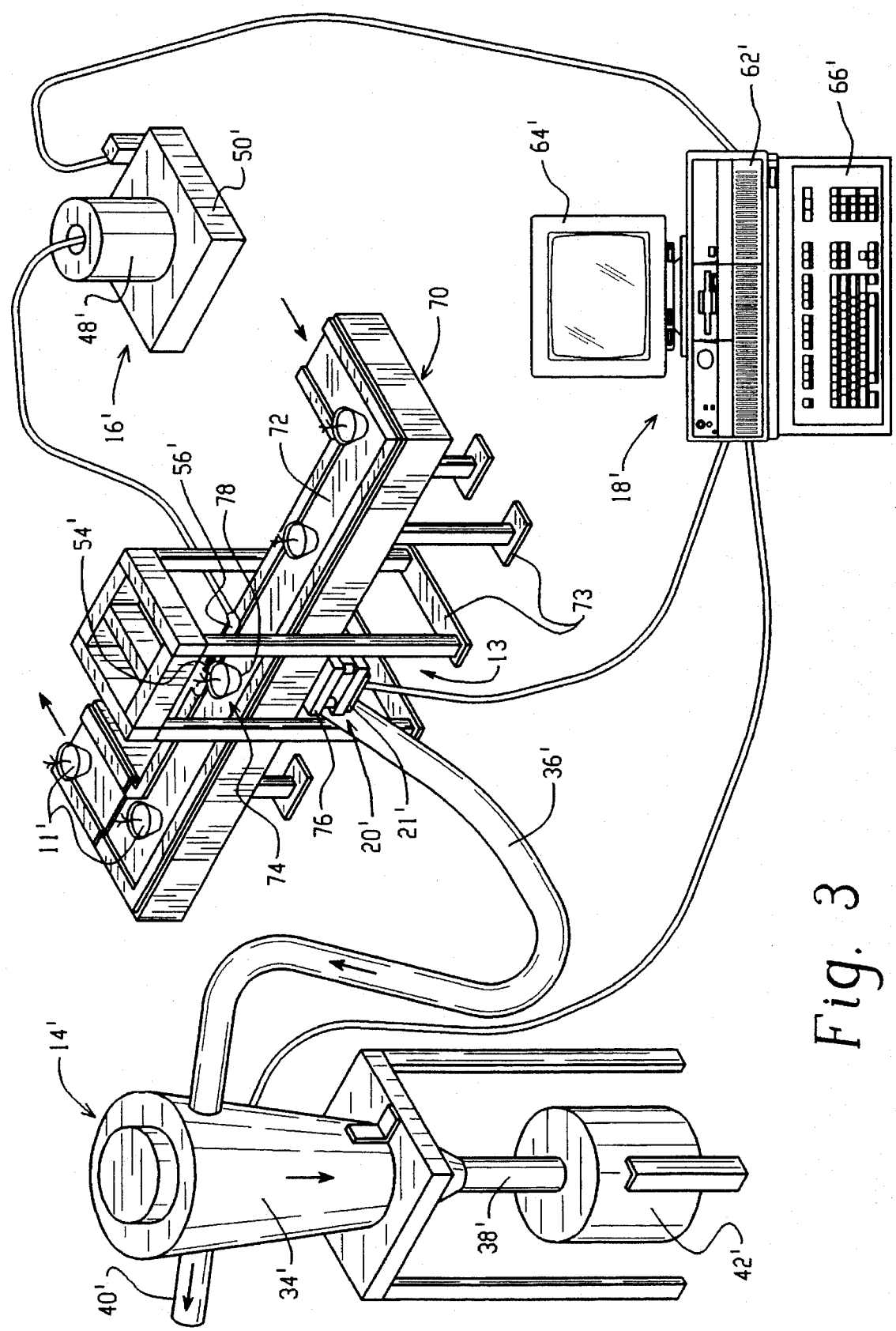
FIG. 3 is a schematic view of an alternate embodiment of the apparatus of the present invention.

In an alternate embodiment of the present invention, illustrated in FIG. 3, the live plants 11' are provided to a fluid removal system 13 which comprises a substantially sealed pressure container 20' which may also include a scale 21' for weighing the plant before and after operation of the system 13, and an interconnected vacuum system 14' of the type described above. As the elements of the alternate embodiment are substantially similar to those previously described, the components of the alternate system will be referred to with a prime designation. A root treatment system 16' for adding root treatment solution to the rooting medium is also provided. The live plants 11' are provided to the fluid removal system by a transport system 70 which comprises a conventional continuous conveyor mechanism 72. A frame 73 for supporting the transport, fluid removal system, and root treatment system is also provided.

The conveyor 72 of the transport system 13 movably supports and transports the containers C' having the rooting medium and the live plant roots maintained therein to a station 74 of the fluid removal system 13. Upon being provided to the station 74, the conveyor stops to permit operation of the fluid removal and root treatment systems. Specifically, a pressure container 76 movable by conventional pneumatic or hydraulic cylinders, is vertically raised to engage the portion of the container C' with the runoff opening O' through an opening 78 in the conveyor adjacent each live plant 11'. Once the pressure container 76 is engaged to cover the runoff opening O, a substantially sealed relationship is formed, and the vacuum system 14' is operated to draw fluid from the live plant container as previously described.

Upon removal of the desired amount of fluid, the vacuum system shuts off, and the pressure container 76 is lowered from engagement with the live plant container. The root treatment system 16' may then be operated as described above. A sprayer 44' consisting of a nozzle 54' supplied with solution via conduit 56' and tubing 46' from the reservoir 48' is provided. Following operation of the root treatment system 16' to provide the desired amount of solution, the conveyor 72 is reactivated to move the next live plant 11' on the transport system to the station 76. With this alternate embodiment, the controller system 18 operates to choreograph both operation of the vacuum and root treatment systems, as well as movement of the live plants along the transport system 13.

Operation of the present invention enables the direct and efficient removal of the fluid from a live plant to treat the live plant. Where packaging in a sealed container is desired, the amount of fluid within the sealed container can be critical to the survival of the plant, which, during shipment and sale, does not receive any of the care or maintenance that live plants normally require.

Although the present invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. An apparatus for the preparation of a live plant for packaging, the live plant including roots, a stem, and foliage, the roots of the live plant being surrounded by rooting medium, the rooting medium containing fluid, the rooting medium and the roots of the live plant being maintained within a container, the container having a runoff opening therein, said apparatus comprising:

a substantially sealed pressure vessel for receiving at least one container having rooting medium and roots of a live plant maintained therein; and a vacuum system connected to said substantially sealed pressure vessel for drawing air through the rooting medium in the container and through said substantially sealed pressure vessel and removing a predetermined amount of fluid from the rooting medium in the container via the container runoff opening, wherein said vacuum system further comprises a particulate separator for removing particulate from the air being drawing through the rooting medium in the container and through said substantially sealed pressure vessel.

2. An apparatus for the treatment of a live plant, the live plant including roots, a stem, and foliage, the roots of the live plant being surrounded by rooting medium, the rooting medium containing fluid, the rooting medium and the roots of the live plant being maintained within a container, the container having a runoff opening therein, said apparatus comprising:

a substantially sealed pressure vessel for receiving a container having rooting medium and roots of a live plant maintained therein;

a vacuum system connected to said substantially sealed pressure vessel for drawing air through the rooting medium in the container and through said substantially sealed pressure vessel and removing a predetermined amount of fluid from the rooting medium in the container via the container runoff opening, wherein said vacuum system further comprises a particulate separator for removing particulate from the air being drawn through the rooting medium in the container and through said substantially sealed pressure vessel; and a root treatment system for adding a predetermined amount of a root treatment solution to the rooting medium in the container.

* * * * *